US008643335B2

(12) United States Patent
Arakawa et al.

(10) Patent No.: US 8,643,335 B2
(45) Date of Patent: Feb. 4, 2014

(54) POWER SUPPLY APPARATUS

(75) Inventors: Shinichi Arakawa, Wako (JP);
Yasumichi Ohnuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/816,919

(22) PCT Filed: Dec. 20, 2011

(86) PCT No.: PCT/JP2011/079481
§ 371 (c)(1),
(2), (4) Date: Feb. 13, 2013

(87) PCT Pub. No.: WO2012/086633
PCT Pub. Date: Jun. 28, 2012

(65) Prior Publication Data
US 2013/0285611 A1    Oct. 31, 2013

(30) Foreign Application Priority Data

Dec. 21, 2010  (JP) ................................. 2010-284907

(51) Int. Cl.
*H02J 7/00* (2006.01)
*H02J 7/04* (2006.01)

(52) U.S. Cl.
USPC ........... 320/126; 320/107; 320/112; 320/134; 320/162; 180/65.1

(58) Field of Classification Search
USPC ............................................ 320/126
See application file for complete search history.

(56) References Cited

U.S. PATENT DOCUMENTS

| 7,199,556 | B1 * | 4/2007 | Benckenstein et al. | 320/119 |
| 7,553,583 | B2 * | 6/2009 | Eaves | 429/61 |
| 8,143,855 | B2 * | 3/2012 | Davis | 320/126 |
| 2002/0167295 | A1 | 11/2002 | Yamashita | |
| 2005/0077874 | A1 | 4/2005 | Nakao | |

FOREIGN PATENT DOCUMENTS

| JP | 2003-174738 A | 6/2003 |
| JP | 2009-212020 A | 9/2003 |
| JP | 2007-259612 A | 10/2007 |

(Continued)

OTHER PUBLICATIONS

International Search Report, PCT/JP2011/079481 dated Apr. 3, 2012.

(Continued)

*Primary Examiner* — Drew A Dunn
*Assistant Examiner* — Nathaniel Pelton
(74) *Attorney, Agent, or Firm* — Arent Fox LLP

(57) ABSTRACT

A power supply apparatus includes: a plurality of power supply units; a positive polarity coupling portion; and a negative polarity coupling portion; each of the power supply units is provided with: battery units; first relays connected in series to the battery units, capable of disconnecting electrical connection between the battery units and any one of the positive polarity coupling portion and the negative polarity coupling portion; resistor elements having one ends which are connected to the battery units between the battery units and the first relay; a resistor coupling portion; and a second relay connected to the resistor coupling portion, capable of disconnecting electrical connection between the resistor coupling portion and any one of the positive polarity coupling portion and the negative polarity coupling portion which is connected to the first relays, the second relay having fewer in number than the number of the power supply units.

8 Claims, 10 Drawing Sheets

(56) References Cited

FOREIGN PATENT DOCUMENTS

| | | |
|---|---|---|
| JP | 2008-118790 A | 5/2008 |
| JP | 2008-035581 A | 10/2008 |
| JP | 2010-45923 A | 2/2010 |
| JP | 2011-024404 A | 2/2011 |
| JP | 2012-205410 A | 10/2012 |
| WO | WO 2012/086633 A1 | 6/2012 |

OTHER PUBLICATIONS

Extended European Search Report, Application No. 12165300.0-2207 / 2518859, Feb. 7, 2013.

Notice of Allowance, Application No. 2011-099978, May 21, 2013.

\* cited by examiner

POWER SUPPLY APPARATUS

CROSS-REFERENCED TO RELATED APPLICATION

This application is a National Stage entry of International Application PCT/JP2011/079481, filed Dec. 20, 2011, which claims priority to Japanese Patent Application No. 2010-284907, filed Dec. 21, 2010, the disclosure of the prior application(s) are hereby incorporated in their entirety by reference.

BACKGROUND OF THE INVENTION

1. Field of the Invention

The present invention relates to a power supply apparatus.

Priority is claimed on Japanese Patent Application No. 2010-284907, filed Dec. 21, 2010, the contents of which are incorporated herein by reference.

2. Description of Related Art

Conventionally, as a power supply apparatus that is formed, for example, by connecting a plurality of batteries in parallel, a power supply apparatus is known in which positive main relays are connected in series between an electrical load, which is connected to this power supply apparatus, and the positive polarity terminal of each battery, and negative main relays are connected in series between the electrical load and the negative polarity terminal of each battery, and pre-charge circuits, which are formed by connecting a resistor and a relay in series and which are used for pre-charging, are connected in parallel to each positive main relay (see, for example, Japanese Unexamined Patent Application, First Publication No. 2008-35581 (Patent document 1)).

This power supply apparatus is set such that, in order to prevent an excessively large current flowing to the electrical load, the positive main relays are opened so that the relay of the pre-charge circuit is connected. As a result of this, the current flows to the resistor of the pre-charge circuit.

Moreover, conventionally, as a power storage apparatus that is formed, for example, by connecting a plurality of batteries in parallel, a power storage apparatus is also known in which resistor elements that are used to eliminate any voltage unevenness between the plurality of batteries are connected in series between an electrical load, which is connected to this power storage device, and the positive polarity terminal of each battery, and resistor short-circuiting switches are connected in parallel to each resistor element (see, for example, Japanese Unexamined Patent Application, First Publication No. 2009-212020 (Patent document 2)).

This power storage device is set such that, in order to eliminate voltage unevenness between the plurality of batteries, the resistor short-circuiting switches are turned off, and the plurality of batteries are connected together by the resistor elements. As a result of this, current flows among the plurality of batteries to the resistor elements.

However, in the above-described power supply apparatus according to the conventional technology, as the number of batteries that are connected together in parallel increases, the number of pre-charge circuits also increases. As a consequence, the problems arise that, not only do the costs associated with the apparatus structure increase, but because of the increased size, it is more difficult to install the power supply apparatus.

SUMMARY OF THE INVENTION

The present invention was conceived in view of the above-described circumstances. It is an object of the present invention to provide a power supply apparatus that, while restricting any increase in the costs associated with the apparatus structure and any increase in the size of the apparatus, is able to suitably prevent an excessively large current from being output, and to also appropriately eliminate voltage unevenness between a plurality of batteries.

In order to achieve the above-described object, the present invention employs the following structure.

(1) Namely, the power supply apparatus according to an embodiment of the present invention includes: a plurality of power supply units which are connected in parallel; a positive polarity coupling portion in which positive polarity terminals of the power supply units are coupled together; and a negative polarity coupling portion in which negative polarity terminals of the power supply units are coupled together, each of the power supply units is provided with: battery units; first relays connected in series to the battery units, capable of disconnecting electrical connection between the battery units and any one of the positive polarity coupling portion and the negative polarity coupling portion; resistor elements having one ends which are connected to the battery units between the battery units and the first relays, the first relays being connected to the any one of the positive polarity terminal and the negative polarity terminal of the battery units; a resistor coupling portion to which the other ends of the resistor elements are connected; and a second relay connected to the resistor coupling portion, capable of disconnecting electrical connection between the resistor coupling portion and any one of the positive polarity coupling portion and the negative polarity coupling portion which is connected to the first relays, the second relay having fewer in number than the number of the power supply units.

(2) It is also possible for the power supply apparatus described above in (1) to be formed in the following way. Namely, there may be further provided third relays connected to the battery units, capable of disconnecting electrical connection between the battery units and the any one of the positive polarity coupling portion and the negative polarity coupling portion.

(3) It is also possible for the power supply apparatus described above in (2) to be formed in the following way. Namely, there may be further provided balance resistor elements connecting the battery units together between the battery units of the power supply units and the third relays, the third relays are connected in series to the battery units in each of the power supply units; and the number of the third relays is the same as the number of the power supply units.

(4) It is also possible for the power supply apparatus described above in (3) to be formed in the following way. Namely, when the number of the battery units is m representing a natural number of 2 or more, the number of the balance resistor elements is represented as m−1, and in the battery units whose number is m, the battery units whose number is more than one but less than m are connected to another battery unit whose number is one.

(5) It is also possible for the power supply apparatus described above in (3) to be formed in the following way. Namely, when the number of the battery units is m representing a natural number of 2 or more, the number of the balance resistor elements is represented as m In the battery units whose number is m, all of the battery units are connected to two the other the battery units whose number is two.

(6) It is also possible for the power supply apparatus described above in any one of (3) and (5) to be formed in the following way. Namely, each of the battery units of the power supply units is provided with a current sensor, the current sensor is located externally of a closed loop circuit, and the closed loop circuit includes the battery units, the resistor elements, and the balance resistor elements.

In the power supply apparatus described above in (1), the smoothing capacitor of the power supply apparatus is charged via the resistor elements prior to the first relay being placed in a connected state. Because of this, pre-charging is performed that suppresses an excessively large inrush current when the first relay is placed in a connected state. Furthermore, because the number of second relays in the plurality of power supply units which are connected together in parallel is less than the number of the plurality of power supply units, compared, for example, with when a second relay is provided in each individual power supply unit, it is possible to suppress any increase in the costs associated with the apparatus structure. Furthermore, it is possible to prevent it becoming more difficult to install the power supply apparatus due to the apparatus increasing in size.

Moreover, a closed circuit in which a plurality of battery units are connected together via resistor elements is formed between the resistor coupling portion, which is formed by coupling together the other ends of the resistor elements, and the other one out of the positive polarity coupling portion and the negative polarity coupling portion. By employing this type of structure, it is possible to suitably eliminate any voltage unevenness (i.e., capacity unevenness) between the plurality of battery units 21 without, for example, any special circuit elements being provided.

Furthermore, in the power supply apparatus described above in (2), in addition to the first relays, third relays, which are connected in capable of disconnecting electrical connection, are also provided between the battery units and the other one out of the positive polarity coupling section and the negative polarity coupling section, namely, the coupling section that does not have a first relay connected between itself and the battery unit. By employing this type of structure, even, for example, if a fault does occur in a first relay, the connection between the battery units and the external electrical load can still be properly shut down by one of the third relays.

Furthermore, in the power supply apparatus described above in (3), balance resistor elements that connect the plurality of battery units together are provided between the battery units of the plurality of power supply units and the third relays. By employing this type of structure, a closed loop circuit in which the plurality of battery units are connected together by the balance resistors and the resistor elements is formed irrespective of the state of connection of the third relays. As a result, it is possible to suitably eliminate any voltage unevenness (i.e., capacity unevenness) between the plurality of battery units.

Furthermore, according to the power supply apparatus described above in (4), it is possible to prevent the number of required balance resistor elements from increasing excessively, and to suitably eliminate any voltage unevenness (i.e., capacity unevenness) between the plurality of battery units.

Furthermore, according to the power supply apparatus described above in (5), it is possible to connect the m number of balance resistors to the m number of battery units using a delta connection. Because of this, even if a fault does occur in one of the balance resistors, it is possible to properly maintain the closed loop circuit. Furthermore, it is possible to eliminate any voltage unevenness (i.e., capacity unevenness) between a plurality of battery units.

Furthermore, according to the power supply apparatus described above in (6), by providing the current sensors outside the closed loop circuit, the calibration of each current sensor can be properly performed.

DETAILED DESCRIPTION OF THE INVENTION

Hereinafter, a power supply apparatus according to an embodiment of the present invention will be described with reference made to the attached drawings.

Figure 1:
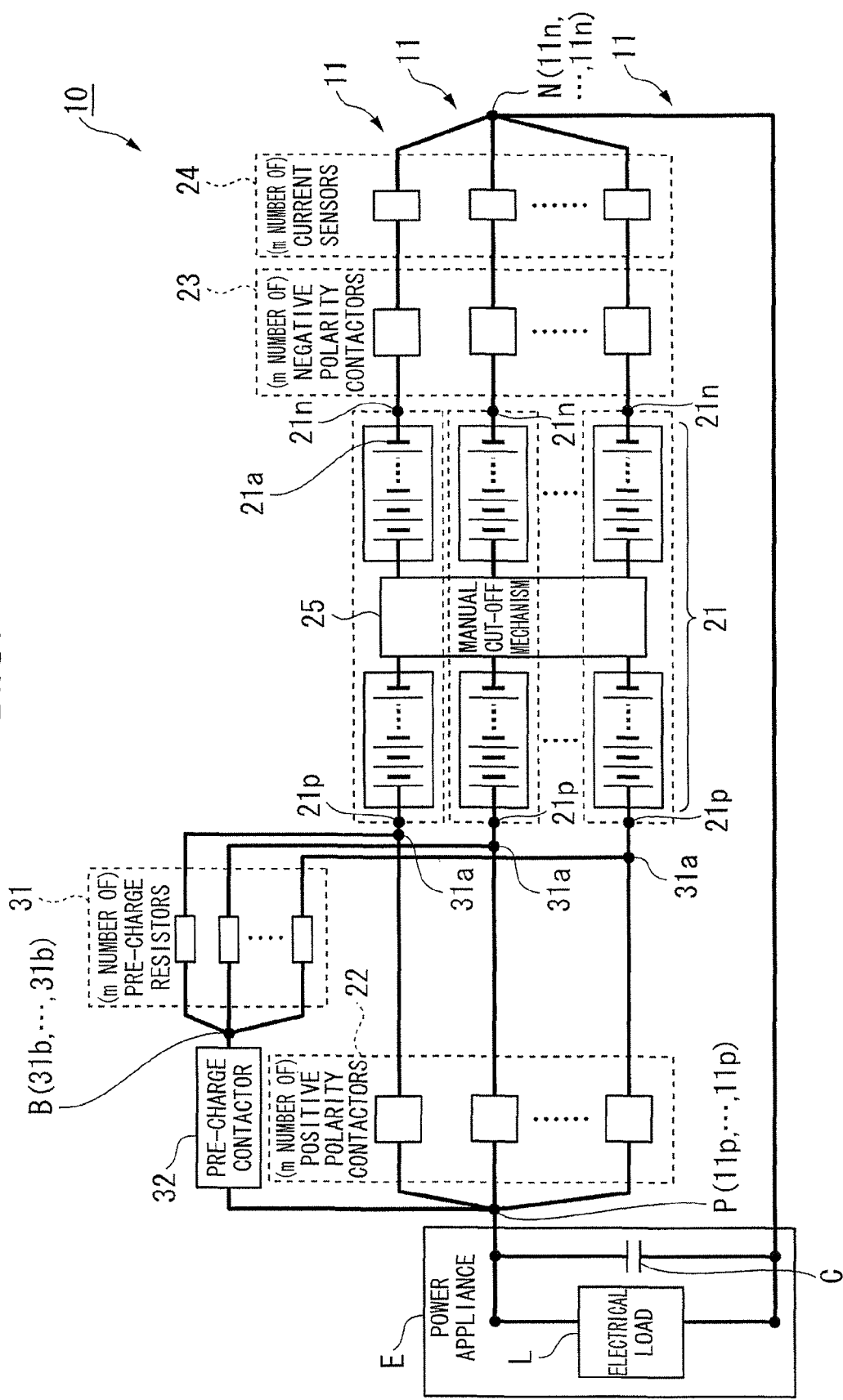
FIG. 1 is a block diagram of a power supply apparatus according to an embodiment of the present invention.

As shown in FIG. 1, for example, a power supply apparatus 10 according to the same embodiment is formed by connecting a plurality of, namely, m representing a natural number of two or more, number of power supply units 11, . . . , 11 together in parallel, and is provided with a positive polarity coupling portion P and a negative polarity coupling portion N. The positive polarity coupling portion P is formed by coupling together the positive polarity terminals 11p of each power supply unit 11 that make up each of the m number of power supply units 11, . . . , 11, and the negative polarity coupling portion N is formed by coupling together the negative polarity terminals 11n of each power supply unit that make up each of the m number of power supply units 11, . . . , 11.

Namely, the positive polarity coupling portion P and the negative polarity coupling portion N of the power supply apparatus 10 are respectively positive polarity and negative polarity output terminals that are connected to an external power appliance E. The m number of power supply units 11, . . . , 11 are connected in parallel to these positive polarity and negative polarity output terminals.

The external power appliance E is provided, for example, with a smoothing capacitor C and an electrical load L that are connected in parallel between the positive polarity and negative polarity output terminals.

Each power supply unit 11 is provided, for example, with a battery unit 21 that is formed by connecting together in series a plurality of battery cells 21a, . . . , 21a, positive polarity connectors 22 that are connected in series between positive polarity terminals 21p of the battery unit 21 and the positive polarity coupling portion P in capable of disconnecting electrical connection, negative polarity connectors 23 that are connected in series between negative polarity terminals 21n of the battery unit 21 and the negative polarity coupling portion N incapable of disconnecting electrical connection, and current sensors 24 that are connected in series between the negative polarity connectors 23 and the negative polarity coupling portion N.

The battery unit 21 is provided, for example, with a manual cut-off mechanism 25 that is formed by a switch or the like that can be disconnected by an operation of an operator, and that is located at the connection positions of the plurality of battery cells 21a, . . . , 21a, which are connected together in series.

In addition, each power supply unit 11 is provided, for example, with a pre-charge resistor 31, of which one end 31a is connected between the positive polarity terminal 21p of the battery unit 21 and the positive polarity connector 22.

In addition, the power supply apparatus 10 is provided with a single pre-charge contactor 32, which is connected in series in capable of disconnecting electrical connection, between a resistor coupling portion B, which is formed by coupling together the other ends 31b of each pre-charge resistor 31 of the m number of power supply units 11, . . . , 11, and the positive polarity coupling portion P.

Namely, for example, according to the power supply apparatus 10 shown in FIG. 1, the number (i.e., m number) of the plurality of battery units 21, . . . , 21, the number (i.e., m number) of the plurality of positive polarity contactors 22, . . . , 22, the number (i.e., m number) of the plurality of negative polarity contactors 23, . . . , 23, the number (i.e., m number) of the plurality of current sensors 24, . . . , 24, and the number (i.e., m number) of the plurality of pre-charge resistors 31, . . . , 31 are all the same number. Compared to the number (i.e., m number) of these components, the number of pre-charge contactors 32 is a smaller number (i.e., 1).

Next, an operation of the power supply apparatus 10 according to the same embodiment will be described.

When the voltage difference between the voltage of the power supply apparatus 10 and the voltage of the smoothing capacitor C is larger than a predetermined difference, such as, for example, when the power supply from the power supply apparatus 10 to the external electrical load L is started, firstly, current flows to each pre-charge resistor 31 so that the smoothing capacitor C is charged gradually. By doing this, each of the positive polarity contactors 22 is set in a disconnected state. Furthermore, each of the negative polarity contactors 23 and the pre-charge contactor 32 are set in a connected state.

By employing this type of structure, the supplying of an excessively large inrush current is prevented. Furthermore, it is possible to prevent failures from occurring, for example, in the welds of electrical contact points and the like that are provided in the respective contactors 22 and 23.

In addition, after the voltage difference between the voltage of the power supply apparatus 10 and the voltage of the smoothing capacitor C has returned to less than a predetermined difference, current is supplied to the respective positive polarity contactors 22. As a result of this, the pre-charge contactor 32 changes to a disconnected state. In addition, each of the positive polarity contactors 22 and the negative polarity contactors 21 change to a connected state.

In this state, a closed circuit in which the m number of battery units 21, . . . , 21 are connected together by the m number of pre-charge resistors 31, . . . , 31 is formed between the resistor coupling portion B and the negative polarity coupling portion N. As a result of this, any voltage unevenness (i.e., capacity unevenness) between the m number of battery units 21, . . . , 21 is eliminated, and the voltages and capacities are uniformized.

In this manner, according to the power supply apparatus 10 of the same embodiment, a single pre-charge contactor 32 is connected in series in capable of disconnecting electrical connection between the resistor coupling portion B, which is formed by coupling together the other ends 31b of the respective pre-charge resistors 31 of each of the plurality of power supply units 11, . . . , 11, and the positive polarity coupling portion P. By employing this type of structure, provided that this pre-charge contactor 32 is in a connected state, current flows to each pre-charge resistor 31. As a result, it is possible to prevent an excessively large current from being supplied to an external power appliance E that is connected to the power supply apparatus 10.

Namely, before the positive polarity contactors 22 are placed in a connected state, the smoothing capacitor C of the power supply apparatus is charged via the pre-charging resistors 31. By doing this, it is possible to perform pre-charging to prevent an excessively large inrush current when the positive polarity contactors 22 are being placed in a connected state. Furthermore, the number of pre-charge contactors 32 (i.e., 1) in the m number of the power supply units 11, . . . , 11, which are connected together in parallel, is fewer than the number of power supply units 11, . . . , 11. By employing this type of structure, compared with when, for example, a pre-charge contactor 32 is provided for each power supply unit 11, . . . , 11, it is possible to limit any increase in the costs associated with the apparatus structure. Furthermore, it is possible to prevent it becoming more difficult to install the power supply apparatus due to the apparatus increasing in size.

Moreover, a closed circuit in which the m number of battery units 21, ..., 21 are connected together by the m number of pre-charge resistors 31, ..., 31 is formed between the resistor coupling portion B and the negative polarity coupling portion N. As a result of this, it is possible to eliminate any voltage unevenness (i.e., capacity unevenness) between the plurality of battery units 21, ..., 21 without, for example, any special circuit elements being provided.

Furthermore, in this same embodiment of the present invention, in addition to the respective positive polarity contactors 22, there are also provided the negative polarity contactors 23 that are connected in series in capable of disconnecting electrical connection between the negative polarity terminals 21n of the battery units 21 and the negative polarity coupling portion N. By employing this type of structure, even if, for example, a fault occurs in the positive polarity contactors 22, the battery units 21 can be suitably disconnected from the external power appliance E by the negative polarity contactors 23.

In the foregoing example, a structure in which a single pre-charge contactor 32 is provided is described, however, the present invention is not limited to this. It is also possible for a plurality of (i.e., two or more, but less than m−1) pre-charge contactors 32, ..., 32 which is a smaller number than the number (i.e., m number) of the plurality of power supply units 11, ..., 11 to be provided.

In this case, if a fault should occur in any one of the pre-charge contactors 32, then the other normally operating pre-charge contactors 32 can still be used.

Figure 2:
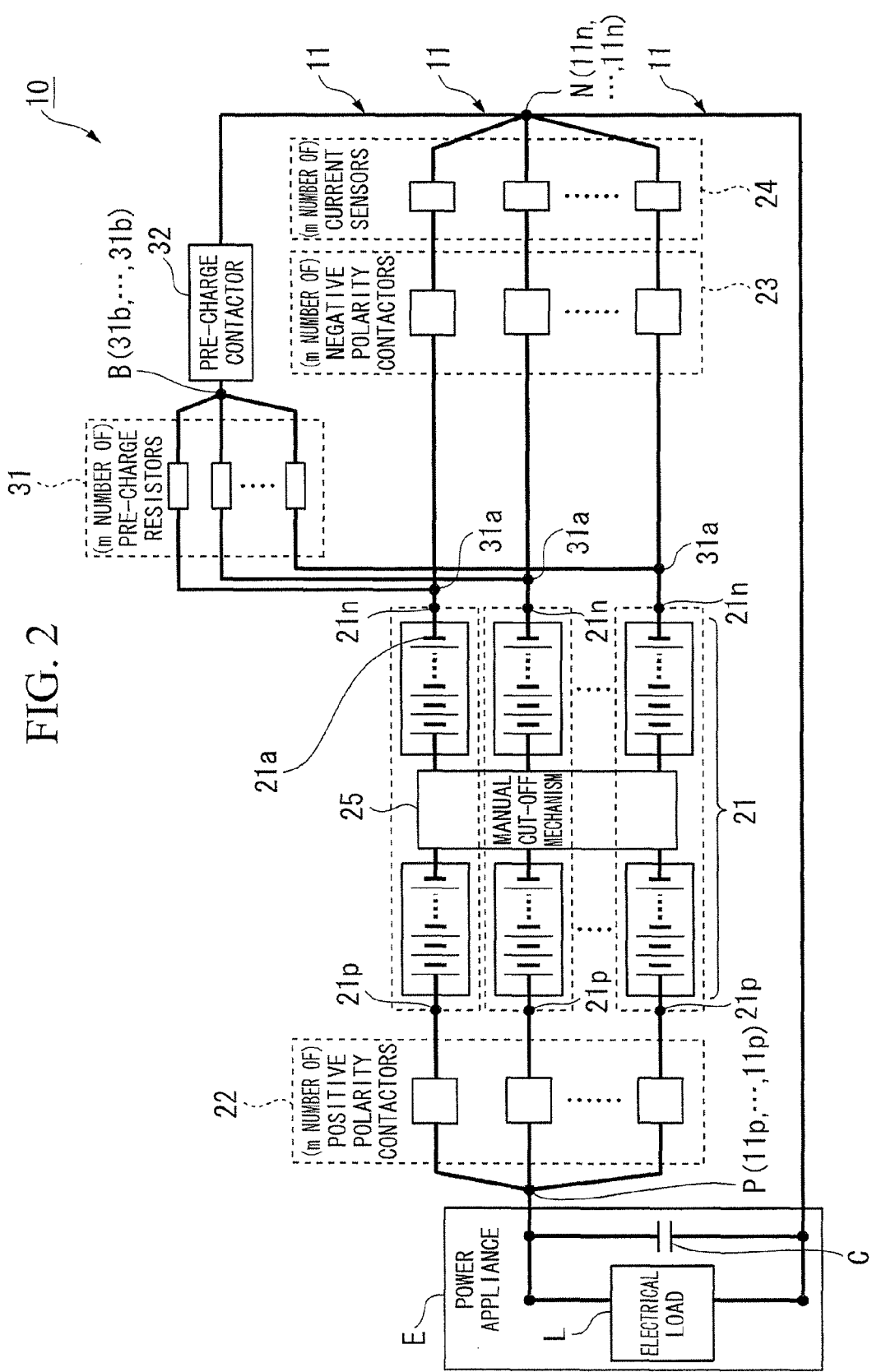
FIG. 2 is a block diagram of a power supply apparatus according to a first variant example of the same embodiment.

In the above-described example, a structure is employed in which the respective pre-charge resistors 31 and the pre-charge contactor 32 are provided on the positive polarity portion of each battery unit 21, however, the present invention is not limited to this. For example, as in a first variant example of the power supply apparatus 10, which is shown in FIG. 2, it is also possible for the respective pre-charge resistors 31 and the pre-charge contactor 32 to be provided on the negative polarity portion of each battery unit 21.

According to this first variant example of the power supply apparatus 10, each power supply unit 11, for example, is provided with a pre-charge resistor 31 of which one end 31a is connected between the negative polarity terminal 21n of the battery unit 21 and the negative polarity contactor 23.

The same first variant example of the power supply apparatus 10 is provided with the single pre-charge connector 32, which is connected in series in capable of disconnecting electrical connection between the resistor coupling portion B, which is formed by coupling together the other ends 31b of each pre-charge resistor 31 of the m number of power supply units 11, ..., 11, and the negative polarity coupling portion N.

Figure 3:
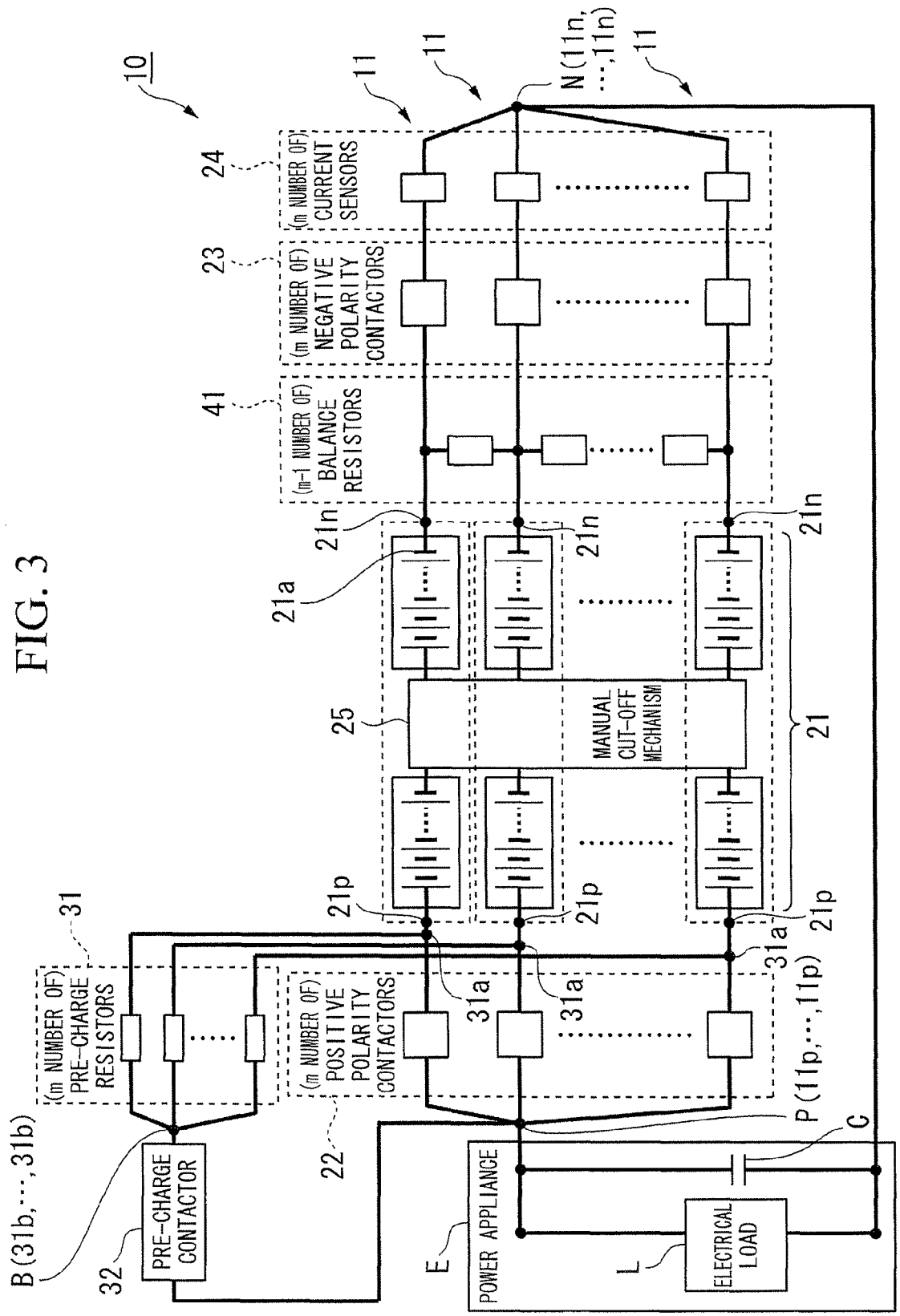
FIG. 3 is a block diagram of a power supply apparatus according to a second variant example of the same embodiment.

As in a second variant example of the power supply apparatus 10 which is shown in FIG. 3, it is also possible for m−1 number of balance resistors 41, ..., 41, which connect each of the battery units 21 together, to be provided between each negative polarity terminal 21n of the m number of battery units 21, ..., 21 and the m number of negative polarity contactors 23, ..., 23 on whichever of the positive polarity terminal 21p of each battery unit 21 and the negative polarity terminal 21n thereof the pre-charge resistors 31 are not connected to, for example, on the negative polarity terminals 21n shown in FIG. 3.

According to this same second variant example of the power supply apparatus 10, as shown, for example, in FIG. 4 through FIG. 7E, the number (i.e., m−1) of balance resistors 41, ..., 41 is one less than the number (i.e., m) of battery units 21, ..., 21. By employing this type of structure, the number of battery units 21 to which only a single balance resistor 41 is connected is to two or more.

Accordingly, of the m number of battery units 21, ..., 21, more than one, but less than m number of battery units 21, ..., 21 are connected to one other battery unit 21.

Moreover, the m number of battery units 21, ..., 21 are connected together by the m−1 number of balance resistors 41, ..., 41. By employing this type of structure, it is not possible for each one of all of the battery units 21, ..., 21 to be connected by a single balance resistor 41 to only one other battery unit 21.

Accordingly, of the m number of battery units 21, ..., 21, the number of battery units that are connected to only one other battery unit 21 by a single balance resistor 41 is less than the number m.

Figure 4:
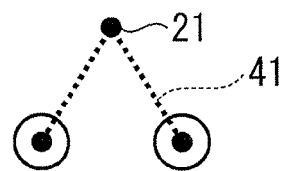
FIG. 4 is a view showing an example of the connections between m number of battery units and m−1 number of balance resistors when m=3 in the power supply apparatus according to the same second variant example.

For example, as shown in FIG. 4, in a connection when m=3 between m number of battery units 21, 21, and 21 and m−1 number of balance resistors 41 and 41, of the m number of battery units 21, 21, and 21, a single battery unit 21 is connected by two balance resistors 41 and 41 to the other two battery units 21 and 21. In addition, two battery units 21 and 21 are connected by one balance resistor 41 each to one other battery unit 21 each. The black circles depicted in FIG. 4 show the battery units, while the broken lines show the number of balance resistors. In FIG. 4, the number of battery units is three, while the number of balance resistors is two.

Figure 5A:
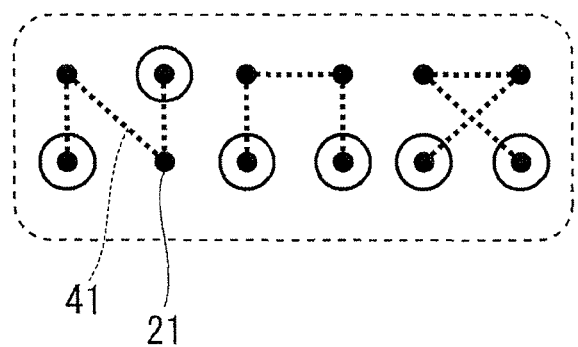
FIG. 5A is a view showing an example of the connections between m number of battery units and m−1 number of balance resistors when m=4 in the power supply apparatus according to the same second variant example.
Figure 5B:
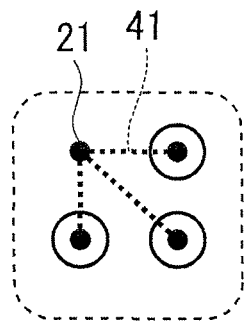
FIG. 5B is a view showing an example of the connections between m number of battery units and m−1 number of balance resistors when m=4 in the power supply apparatus according to the same second variant example.

Moreover, for example, as shown in FIGS. 5A and 5B, in a connection when m=4 between m number of battery units 21, ..., 21 and m−1 number of balance resistors 41, ..., 41, for example, as shown in FIG. 5A, of the m number of battery units 21, ..., 21, two battery units 21 and 21 are connected by two balance resistors 41 and 41 each to two other battery units 21 and 21 each. In addition, two battery units 21 and 21 are each connected by one balance resistor 41 to one other battery unit 21 each. The black circles depicted in FIG. 5A show the battery units, while the broken lines show the number of balance resistors. In FIG. 5A, the number of battery units is four, while the number of balance resistors is three.

Moreover, for example, as shown in FIG. 5B, of the m number of battery units 21, ..., 21, one battery unit 21 is connected by three balance resistors 41, 41, and 41 to three other battery units 21, 21, and 21. In addition, three battery units 21, 21, and 21 are connected by one balance resistor 41 each to one other battery unit 21 each. The black circles depicted in FIG. 5B show the battery units, while the broken lines show the number of balance resistors. In FIG. 5B, the number of battery units is four, while the number of balance resistors is three.

Figure 6A:
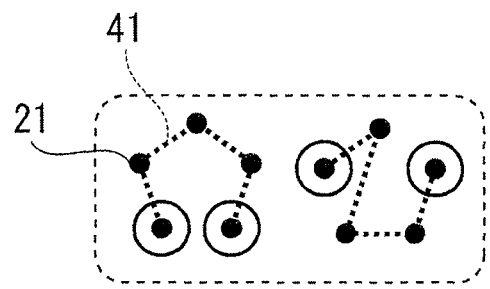
FIG. 6A is a view showing an example of the connections between m number of battery units and m−1 number of balance resistors when m=5 in the power supply apparatus according to the same second variant example.
Figure 6B:
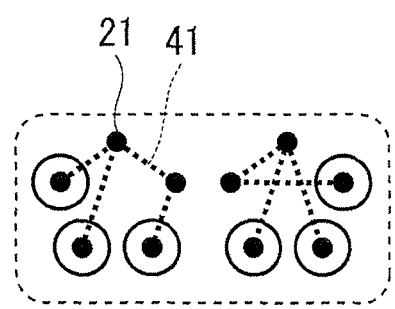
FIG. 6B is a view showing an example of the connections between m number of battery units and m−1 number of balance resistors when m=5 in the power supply apparatus according to the same second variant example.
Figure 6C:
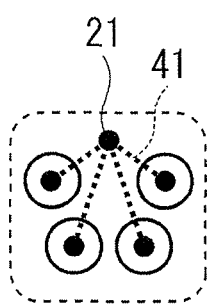
FIG. 6C is a view showing an example of the connections between m number of battery units and m−1 number of balance resistors when m=5 in the power supply apparatus according to the same second variant example.

Moreover, for example, as shown in FIGS. 6A, 6B and 6C, in a connection when m=5 between m number of battery units 21, ..., 21 and m−1 number of balance resistors 41, ..., 41, for example, as shown in FIG. 6A, of the m number of battery units 21, ..., 21, three battery units 21, 21, 21 are each connected by two balance resistors 41 and 41 to two other battery units 21 and 21 each. In addition, two battery units 21 and 21 are connected by one balance resistor 41 each to one other battery unit 21 each. The black circles depicted in FIG. 6A show the battery units, while the broken lines show the number of balance resistors. In FIG. 6A, the number of battery units is five, while the number of balance resistors is four.

Moreover, for example, as shown in FIG. 6B, of the m number of battery units 21, ..., 21, one battery unit 21 is connected by three balance resistors 41, 41, and 41 to three other battery units 21, 21, and 21. In addition, one battery unit 21 is connected by two balance resistors 41 and 41 to two other battery units 21 and 21. In addition, three battery units 21, 21, and 21 are connected by one balance resistor 41 each to one other battery unit 21 each. The black circles depicted in FIG. 6B show the battery units, while the broken lines show the number of balance resistors. In FIG. 6B, the number of battery units is five, while the number of balance resistors is four.

Moreover, for example, as shown in FIG. 6C, of the m number of battery units 21, ..., 21, one battery unit 21 is connected by four balance resistors 41, ..., 41 to four other battery units 21, ..., 21. In addition, four battery units 21, ..., 21 are connected by one balance resistor 41 each to one other battery unit 21 each. The black circles depicted in FIG. 6C show the battery units, while the broken lines show the number of balance resistors. In FIG. 6C, the number of battery units is five, while the number of balance resistors is four.

Figure 7A:
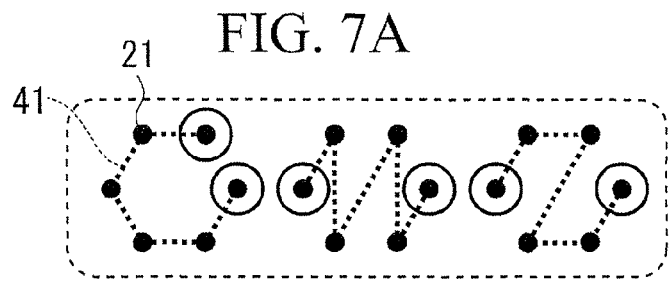
FIG. 7A is a view showing an example of the connections between m number of battery units and m−1 number of balance resistors when m=6 in the power supply apparatus according to the same second variant example.

Moreover, for example, as shown in FIGS. 7A through 7E, in a connection when m=6 between m number of battery units 21, ..., 21 and m−1 number of balance resistors 41, ..., 41, for example, as shown in FIG. 7A, of the m number of battery units 21, ..., 21, four battery units 21, ..., 21 are connected by two balance resistors 41 and 41 each to two other battery units 21 and 21 each. In addition, two battery units 21 and 21 are connected by one balance resistor 41 each to one other battery unit 21 each. The black circles depicted in FIG. 7A show the battery units, while the broken lines show the number of balance resistors. In FIG. 7A, the number of battery units is six, while the number of balance resistors is five.

Figure 7B:
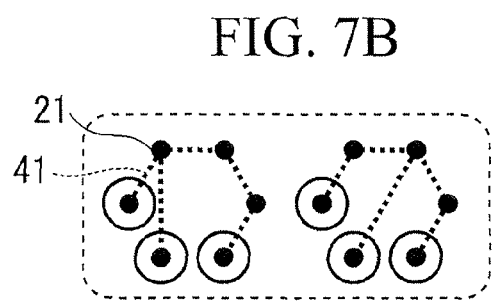
FIG. 7B is a view showing an example of the connections between m number of battery units and m−1 number of balance resistors when m=6 in the power supply apparatus according to the same second variant example.

Moreover, for example, as shown in FIG. 7B, of the m number of battery units 21, ..., 21, one battery unit 21 is connected by three balance resistors 41, 41, and 41 to three other battery units 21, 21, and 21. In addition, two battery units 21 and 21 are connected by two balance resistors 41 and 41 each to two other battery units 21 and 21 each. In addition, three battery units 21, 21, and 21 are connected by one balance resistor 41 each to one other battery unit 21 each. The black circles depicted in FIG. 7B show the battery units, while the broken lines show the number of balance resistors. In FIG. 7B, the number of battery units is six, while the number of balance resistors is five.

Figure 7C:
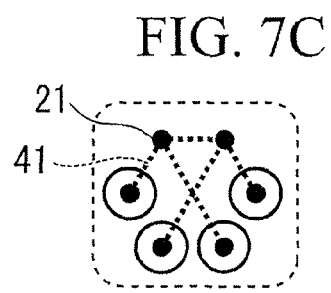
FIG. 7C is a view showing an example of the connections between m number of battery units and m−1 number of balance resistors when m=6 in the power supply apparatus according to the same second variant example.

Moreover, for example, as shown in FIG. 7C, of the m number of battery units 21, ..., 21, two battery units 21 and 21 are connected by three balance resistors 41, 41, and 41 each to three other battery units 21, 21, and 21 each. In addition, four battery units 21, ..., 21 are connected by one balance resistor 41 each to one other battery unit 21 each. The black circles depicted in FIG. 7C show the battery units, while the broken lines show the number of balance resistors. In FIG. 7C, the number of battery units is six, while the number of balance resistors is five.

Figure 7D:
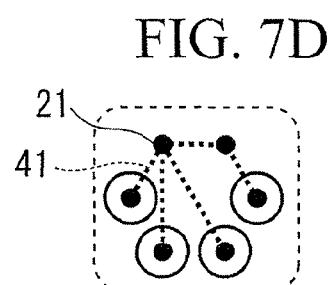
FIG. 7D is a view showing an example of the connections between m number of battery units and m−1 number of balance resistors when m=6 in the power supply apparatus according to the same second variant example.

Moreover, for example, as shown in FIG. 7D, of the m number of battery units 21, ..., 21, one battery unit 21 is connected by four balance resistors 41, ..., 41 to four other battery units 21, ..., 21. Furthermore, one battery unit 21 is connected by two balance resistors 41 and 41 to two other battery units 21 and 21. In addition, four battery units 21, ..., 21 are connected by one balance resistor 41 each to one other battery unit 21 each. The black circles depicted in FIG. 7D show the battery units, while the broken lines show the number of balance resistors. In FIG. 7D, the number of battery units is six, while the number of balance resistors is five.

Figure 7E:
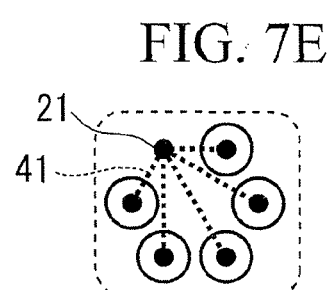
FIG. 7E is a view showing an example of the connections between m number of battery units and m−1 number of balance resistors when m=6 in the power supply apparatus according to the same second variant example.

Moreover, for example, as shown in FIG. 7E, of the m number of battery units 21, ..., 21, one battery unit 21 is connected by four balance resistors 41, ..., 41 to four other battery units 21, ..., 21. In addition, four battery units 21, ..., 21 are connected by one balance resistor 41 each to one other battery unit 21 each. The black circles depicted in FIG. 7E show the battery units, while the broken lines show the number of balance resistors. In FIG. 7E, the number of battery units is six, while the number of balance resistors is five According to this same second variant example, irrespective of the state of connection or disconnection of the m number of negative polarity contactors 23, ..., 23, a closed loop circuit is formed in which m number of battery units 21, ..., 21 are connected together by m−1 number of balance resistors 41, ..., 41 and m number of pre-charge resistors 31, ..., 31. By employing this type of structure, it is possible to eliminate any voltage unevenness (i.e., capacity unevenness) between the plurality of battery units 21, ..., 21.

Moreover, it is possible to prevent the number of required balance resistors 41 from increasing excessively, and to eliminate any voltage unevenness (i.e., capacity unevenness) between the plurality of battery units 21, ..., 21.

Figure 8:
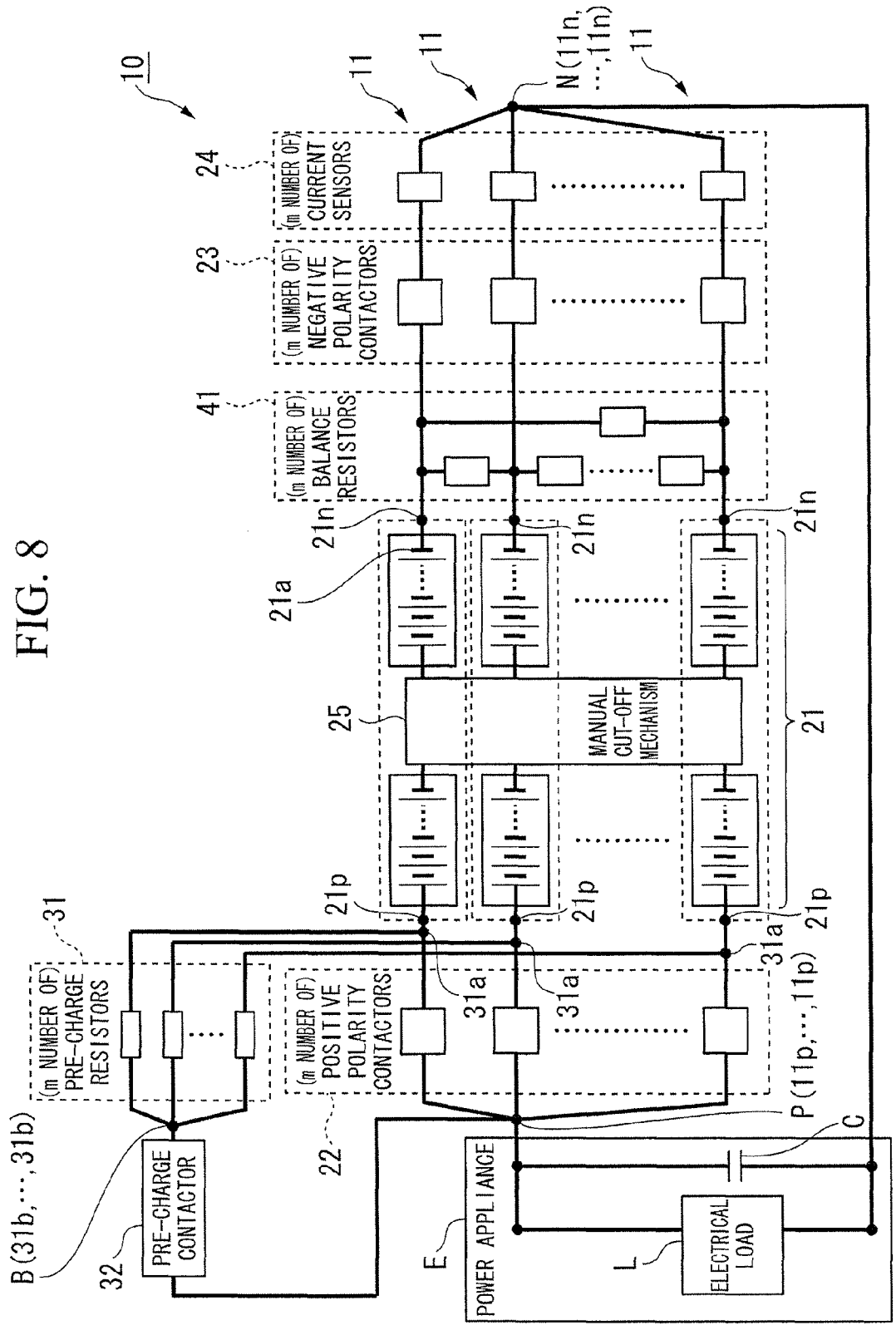
FIG. 8 is a block diagram of a power supply apparatus according to a third variant example of the same embodiment.

As in a third variant example of the power supply apparatus 10 which is shown in FIG. 8, it is also possible for m number of balance resistors 41, ..., 41, which connect each of the battery units 21 together, to be provided on whichever of the positive polarity terminal $21p$ of each battery unit 21 and the negative polarity terminal $21n$ thereof the pre-charge resistor 31 is not connected to, for example, on the negative polarity terminals $21n$ shown in FIG. 8.

For example, the power supply apparatus 10 shown in FIG. 8 is provided with m number of balance resistors 41, ..., 41 that connect each of the battery units 21 together between each of the negative polarity terminals $21n$ of the m number of battery units 21, ..., 21, and the m number of negative polarity contactors 23, ..., 23.

According to this same third variant example, it is possible to connect the m number of balance resistors 41, ..., 41 to the m number of battery units 21, ..., 21 using a delta connection. Even if a fault does occur in one of the balance resistors 41, it is possible to properly maintain the closed loop circuit in which the m number of battery units 21, ..., 21 are connected together by the m−1 number of balance resistors 41, ..., 41 and the m number of pre-charge resistors 31, ..., 31. By employing this type of structure, it is possible to eliminate any voltage unevenness (i.e., capacity unevenness) between the plurality of battery units 21, ..., 21.

Figure 9:
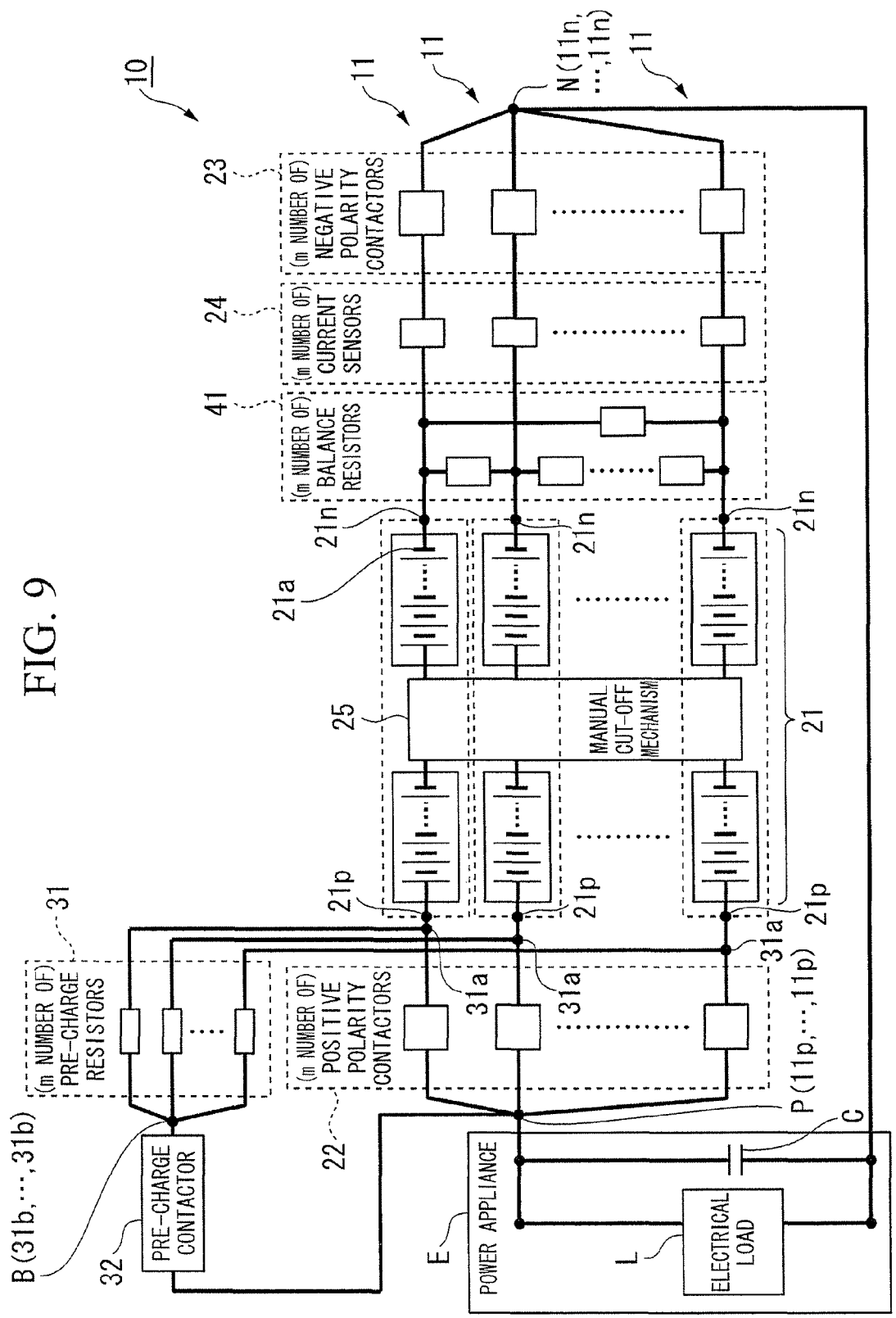
FIG. 9 is a block diagram of a power supply apparatus according to a fourth variant example of the same embodiment.

According to the above-described second and third variant examples, it is also possible for the plurality of current sensors 24, ..., 24 to be placed outside the closed loop circuit that is formed by connecting the m number of battery units 21, ..., 21 together by the (m number or m−1 number of) balance resistors 41, ..., 41 and the m number of pre-charge resistors 31, ..., 31. For example, as in a fourth variant example of the power supply apparatus 10, which is shown in FIG. 9, in each power supply unit 11 it is also possible for the current sensors 24 to be connected between the balance resistors 41 and the negative polarity contactors 23.

As in this same fourth variant example, by placing the plurality of current sensors 24, ..., 24 outside the closed loop that is formed by connecting the m number of battery units 21, ..., 21 together by the (m number or m−1 number of) balance resistors 41, ..., 41 and the m number of pre-charge resistors 31, ..., 31, the calibration of each current sensor 24 can be properly performed.

Figure 10:
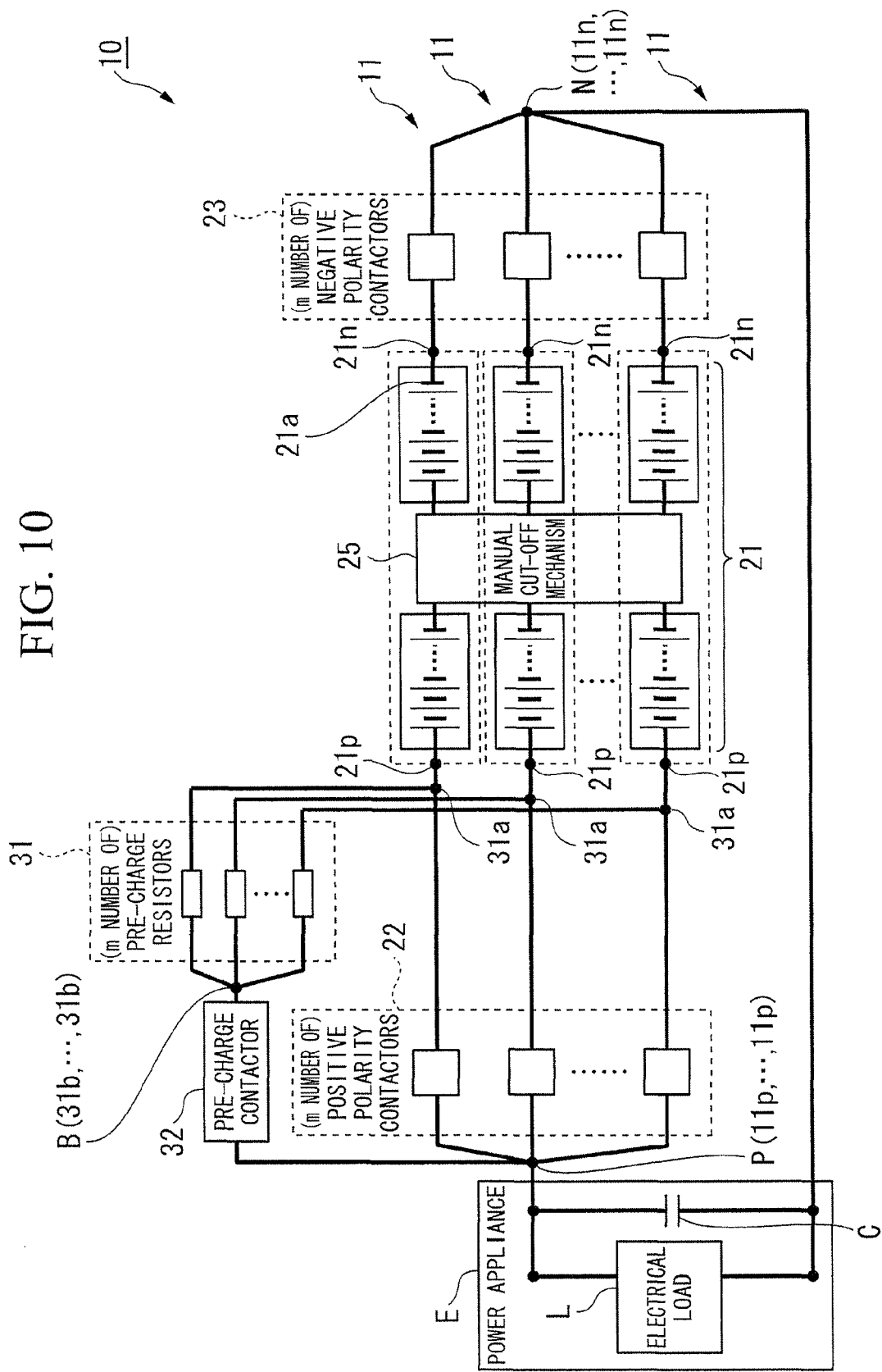
FIG. 10 is a block diagram of a power supply apparatus according to a fifth variant example of the same embodiment.

As in a fifth variant example of the power supply apparatus 10, which is shown in FIG. 10, it is also possible to omit the current sensors 24 from each power source unit 11.

Figure 11:
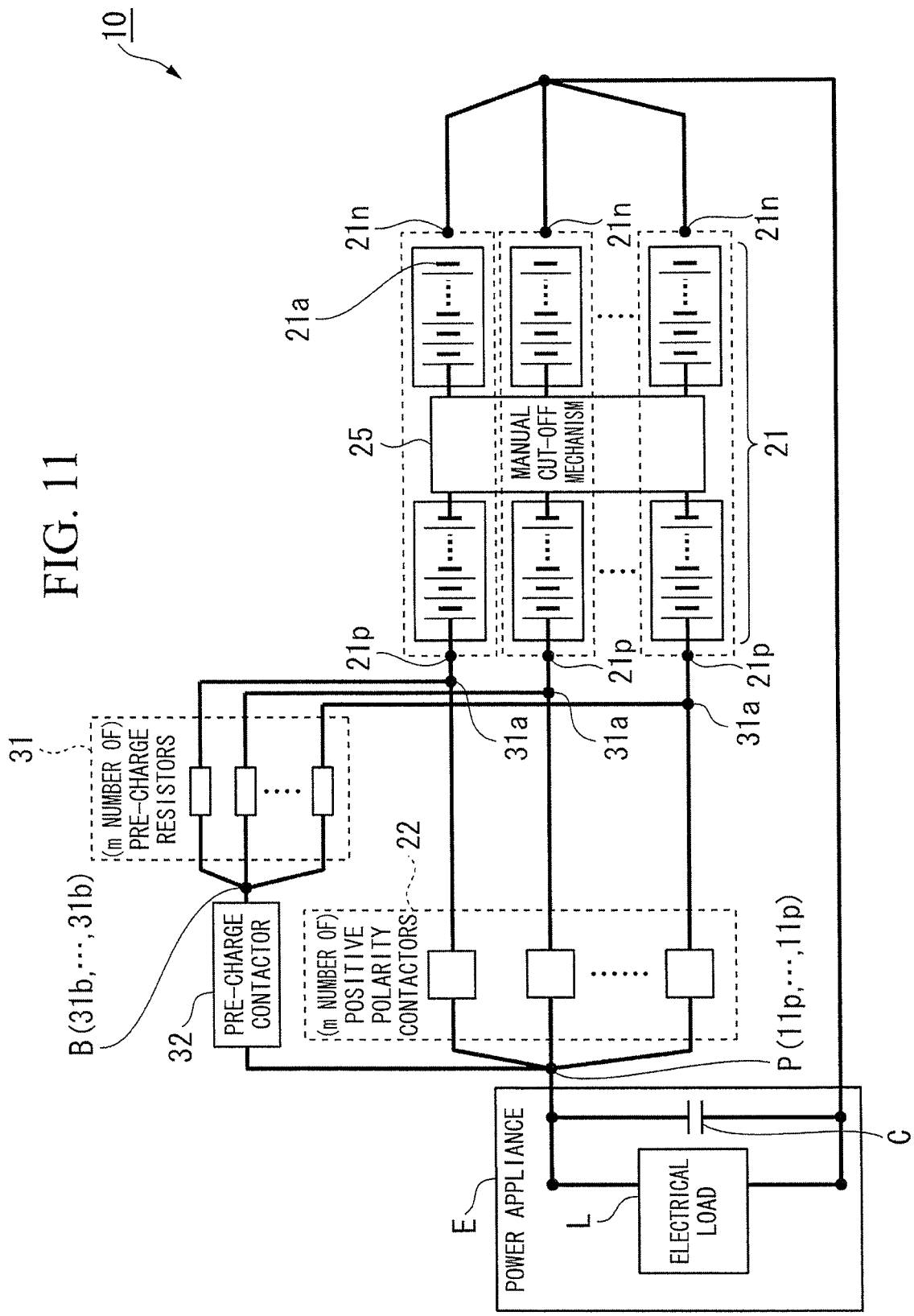
FIG. 11 is a block diagram of a power supply apparatus according to a sixth variant example of the same embodiment.

As in a sixth variant example of the power supply apparatus 10, which is shown in FIG. 11, it is also possible for a relay that is able to disconnect the battery units 21 from the external power appliance E, namely, for the negative polarity contactor 23 to be omitted from whichever of the positive polarity terminal $21p$ of each battery unit 21 and the negative polarity terminal 21n thereof the pre-charge resistor 31 is not connected to, for example, on t the negative polarity terminals 21n shown in FIG. 11.

In the power supply apparatus according to the present invention, because the smoothing capacitor of the power supply apparatus is charged via the resistor elements prior to the first relay being placed in a connected state, pre-charging is performed that suppresses an excessively large inrush current when the first relay is placed in a connected state. Furthermore, because the number of second relays in the plurality of power supply units that are connected together in parallel is less than the number of the plurality of power supply units, compared, for example, with when a second relay is provided in each individual power supply unit, it is possible to restrict any increase in the costs associated with the apparatus structure. Furthermore, it is possible to prevent it becoming more difficult to install the power supply apparatus due to the apparatus increasing in size.

What is claimed is:

1. A power supply apparatus comprising:
a plurality of power supply units which are connected in parallel;
a positive polarity coupling portion in which positive polarity terminals of the power supply units are coupled together; and
a negative polarity coupling portion in which negative polarity terminals of the power supply units are coupled together, wherein
each of the power supply units is provided with:
battery units;
first relays connected in series to the battery units, capable of disconnecting electrical connection between the battery units and any one of the positive polarity coupling portion and the negative polarity coupling portion;
resistor elements having one ends which are connected to the battery units between the battery units and the first relays, the first relays being connected to the any one of the positive polarity terminal and the negative polarity terminal of the battery units;
a resistor coupling portion to which the other ends of the resistor elements are connected; and
a second relay connected to the resistor coupling portion, capable of disconnecting electrical connection between the resistor coupling portion and any one of the positive polarity coupling portion and the negative polarity coupling portion which is connected to the first relays, the second relay having fewer in number than the number of the power supply units.

2. The power supply apparatus according to claim 1, further comprising
third relays connected to the battery units, capable of disconnecting electrical connection between the battery units and the any one of the positive polarity coupling portion and the negative polarity coupling portion.

3. The power supply apparatus according to claim 2, further comprising
balance resistor elements connecting the battery units together between the battery units of the power supply units and the third relays, wherein
the third relays are connected in series to the battery units in each of the power supply units; and
the number of the third relays is the same as the number of the power supply units.

4. The power supply apparatus according to claim 3, wherein
when the number of the battery units is m representing a natural number of 2 or more, the number of the balance resistor elements is represented as m−1, and in the battery units whose number is m, the battery units whose number is more than one but less than m are connected to another battery unit whose number is one.

5. The power supply apparatus according to claim 3, wherein
when the number of the battery units is m representing a natural number of 2 or more, the number of the balance resistor elements is represented as m, and in the battery units whose number is m, all of the battery units are connected to the other battery units whose number is two.

6. The power supply apparatus according to claim 3, wherein
each of the battery units of the power supply units is provided with a current sensor, the current sensor is located externally of a closed loop circuit, and the closed loop circuit includes the battery units, the resistor elements, and the balance resistor elements.

7. The power supply apparatus according to claim 4, wherein
each of the battery units of the power supply units is provided with a current sensor, the current sensor is located externally of a closed loop circuit, and the closed loop circuit includes the battery units, the resistor elements, and the balance resistor elements.

8. The power supply apparatus according to claim 5, wherein
each of the battery units of the power supply units is provided with a current sensor, the current sensor is located externally of a closed loop circuit, and the closed loop circuit includes the battery units, the resistor elements, and the balance resistor elements.

* * * * *